United States Patent

Falicoff et al.

[11] Patent Number: 5,910,528
[45] Date of Patent: Jun. 8, 1999

[54] TABLE TENNIS RUBBER SOLVENT AND ADHESIVE SYSTEMS

[76] Inventors: Waqidi Falicoff, 2921 Nova Dr.; Harald Sandner, 650 Tolman Creek Rd., both of Ashland, Oreg. 97520

[21] Appl. No.: 08/826,163

[22] Filed: Mar. 27, 1997

Related U.S. Application Data

[60] Provisional application No. 60/014,457, Mar. 27, 1996.

[51] Int. Cl.$^6$ ........................................................ C08K 5/10

[52] U.S. Cl. .......................................... 524/315; 252/364

[58] Field of Search ............................... 252/364; 524/315

[56] References Cited

U.S. PATENT DOCUMENTS

| | | | |
|---|---|---|---|
| 4,929,533 | 5/1990 | Nishikawa | 430/169 |
| 5,049,417 | 9/1991 | Tsubota et al. | |
| 5,599,783 | 2/1997 | Ide | 510/412 |
| 5,602,186 | 2/1997 | Myers | 521/41 |
| 5,612,303 | 3/1997 | Takayanagi et al. | |
| 5,665,268 | 9/1997 | DeGuertechin | 510/214 |
| 5,750,487 | 5/1998 | Oldenhove | 510/365 |

Primary Examiner—Paul R. Michl

[57] ABSTRACT

Solvent systems, and adhesive systems comprising such solvent systems, primarily for use in forming speed-glued table tennis rackets are described. One embodiment of the solvent systems comprises a cycloalkane having from about 3 to about 10 carbon atoms, an ester having from about 2 to about 10 carbon atoms, and a terpene having a molecular weight of from about 110 to about 160. The cycloalkane generally is selected from the group consisting of cyclopentane, cyclohexane, and cycloheptane, with cyclohexane being a currently preferred cycloalkane. A currently preferred ester is ethyl acetate, and a currently preferred terpene is limonene. The solvent system also may comprise an ether, and preferred ethers are dipropylene glycol dimethyl ether and propylene glycol methyl ether acetate. The solvent system also can include an aliphatic alkane having about 10 carbon atoms or fewer, the aliphatic alkane being used in sufficient quantity to adjust the vapor pressure of the solvent system to be from about 50 mm/Hg to about 100 mm/Hg at 25° C. Examples of suitable aliphatic alkanes are heptane, 2,2,4-trimethylpentane and mixtures thereof. The present invention also provides adhesive systems for use in forming speed-glued table tennis rackets. The adhesive system comprises the solvent systems described above, and from about 2 to about 10 weight percent of a solid or solids suitable for speed gluing table tennis rubbers to table tennis blades. A method for speed gluing a table tennis racket also is described. The method generally comprises forming a solvent or adhesive system as discussed above. The solvent or adhesive system is then applied to a table tennis rubber, a table tennis blade, or both. The rubber is then attached to the blade to form a speed-glued table tennis racket. If just a solvent system is used, then the rubber and/or the blade must provide sufficient solid or solids to adhere the rubber to the blade.

2 Claims, No Drawings

TABLE TENNIS RUBBER SOLVENT AND ADHESIVE SYSTEMS

CROSS REFERENCE TO RELATED APPLICATION

This application claims priority from Falicoff et al.'s U.S. provisional patent application, No. 60/014,457, entitled "Table Tennis Rubber Speed & Spin Enhancement Adhesive & Solvent Adhesive System," filed Mar. 27, 1996. Provisional application No. 60/014,457 is incorporated herein by reference.

FIELD OF THE INVENTION

This invention concerns solvents for adhesive systems and the adhesive systems comprising such solvents, which are useful for a variety of purposes including attaching table tennis rubbers to table tennis blades.

BACKGROUND OF THE INVENTION

Technical innovations and changes in the regulations relating to the equipment used in the sport of table tennis have had a major impact on the sport, affecting the outcome of many high profile tournaments, including the World Championships. In particular, there have been many technological improvements made to the table tennis racket and its two main components—the rubber and the blade—since the formal organization of the sport by the International Table Tennis Federation (ITTF) in 1926 (the ITTF is still the world governing body). Modern table tennis rackets have an "inverted rubber" (also referred to just as "rubber") which consists of a top sheet made of vulcanized rubber that is bonded to an inner layer of expanded rubber sponge or foam. The rubber is adhered to optimized wood or wood-composite blades. The playing characteristics of modern table tennis rackets bear little resemblance to the rackets employed in the 1920s or, for that matter, even those used in the 1950s. A world class player can produce shots with ball speeds up to 100 miles per hour and ball spins of up to 9000 revolutions per minute using modern equipment.

In the late 1970s a number of European table tennis players discovered that certain types of adhesives affect the playing characteristics of the rubber. These players would remove the rubber from the blade a short period prior to playing a match and then "reglue" (a commonly employed term in the sport of table tennis) the rubber onto the blade using glues based on solvents such as trichloroethylene and 1,1,1-trichloroethane. Prior to this regluing innovation, the only time a sheet of rubber was glued on was when an old worn out rubber sheet was to be replaced, or about every three to six months. Most of the glues employed were the types used to repair inner tubes of bicycles and automotive tires, the cold one-part vulcanizing fluids. Players found that with so-called "speed glued rubber," they could produce shots with increased speed and spin compared to rubber put on the racket with traditional rubber cements previously employed in the sport. The main disadvantages of speed glue were that the high performance effect lasted only a few hours and the rubber had a shorter playing lifetime than those glued on once with the traditional rubber cements.

The first players to exploit the benefits of the speed glue effect were the European players from Yugoslavia and Hungary, including I. Jonyer, T. Klampar, G. Gergely and D. Surbek. According to Rufford Harrison, Chairman of the ITTF Equipment Committee, Dragutin Surbek of Yugoslavia is given the major credit for popularizing this practice from 1979 to 1983. Surbek was World Doubles Champion in 1979 and 1983. Many coaches and world-class players attribute the dominance of the European players in the World Championships from 1989 to 1993, when Sweden won three World Team Titles, to the discovery of the speed glue effect. The previous twenty-year dominance by the Chinese players thus came to an end. In fact, the European success, based on the use of speed glue, was so resounding that many, if not most, of the modern Chinese players began to emulate the European style.

Numerous speed glue products based on the above solvents, and others such as toluene, were produced during the 1980s and the early 1990s by table tennis manufacturers. However, in 1992 and in the years ensuing, the ITTF decided to phase out the use of certain solvents because of health considerations. By early 1995, the ITTF prohibited the use of the following solvents and solvent types in table tennis glue: all halogenated solvents; all solvents with benzene rings; and N-hexane. In addition, the ITTF established a policy of randomly testing players' rackets in major international tournaments to determine whether the glue met ITTF regulations with regard to the banned solvents. In the 1995 World Championships, Kim Taek Soo of Korea was the first player in the history of the sport to be disqualified for using illegal glue after he had won his quarterfinal match.

Many players throughout the world continue to use speed glues based on ITTF-banned solvents in minor and major tournaments because the performance of the current ITTF-approved speed glues is inferior. In the U.S., for example, most table tennis dealers continue to sell speed glues with illegal solvents such as trichloroethylene, which is a very difficult solvent to obtain in Europe. Further, many players are able to purchase glues and solvents designed for other markets. Cold vulcanizing fluids for automotive tire repair and cigarette lighter fluids are two common products used by players who re-glue.

Numerous players who have based their game on the now illegal speed glues find themselves unable to compete against other playing styles with the currently approved table tennis glues. In the 1995 World Championships all four finalists were Chinese, an unexpected result considering the world rankings of the top European players. The style of play used by certain Chinese players was not affected as much by the change in performance associated with the new breed of ITTF-approved speed glues. In 1993 and 1994, the English Table Tennis Association (ETTA) went even further than the ITTF by banning all solvent-based speed-glues. The player outcry was so great that the ETTA reversed itself in 1995 and allowed the ITTF-approved speed glues to be used in tournaments, ostensibly because English players found themselves at too great a disadvantage in international tournaments.

Estimates concerning the change in performance of the new approved glues compared to the old ones vary. One reason for this is that the performance depends, at least to some degree, on playing styles. A common figure offered by world class players is that the best currently approved glues boost performance by about 15% in both speed and spin compared with non-speed glued rubber. This can be compared with a 30% boost associated with the old (now prohibited) speed glues.

Christian Lillieroos, a USATT Certified National Coach and National Coach of the United States Para-Olympic team, recommends that, in order to get the maximum performance out of the new breed of speed glues, players must pre-glue the sheets before playing approximately four or five times. After a few more reglues the glue buildup is so great as to affect the performance of the rubber. Eventually, the solvents in the glue cannot penetrate the solid rubber buildup on the back of the sponge. Without the solvent action on the sponge the speed glue effect generally is eliminated. In addition, with each successive application of glue, the weight of the rubber sheet is increased. Beyond a certain weight, the sheet must be discarded as the overall racket weight becomes too heavy for the player to use. Alternatively, the player can attempt to remove the glue buildup by various means, a very messy and not always successful process.

In order to reduce the amount of rubber build-up on the sponge, many players employ an ITTF-legal speed glue for three or four speed gluings and then switch to a blend of illegal solvents which provides improved performance without adding to the weight of the sheet. However, there have been a number of problems associated with the use of these illegal solvents, aside from the fact that they are not permitted for use by the ITTF. First, the degree of tack remaining on the rubber after using a solvent blend is not always sufficient to re-attach the rubber to the wood surface of the blade. Second, the performance is not consistent from one gluing session to the next. One possible explanation for this is that the illegal solvents currently employed for this purpose may degrade the built-up rubber layer covering the sponge so that the interface has diminished dynamic properties. Finally, at this time no manufacturer has had a pure solvent blend approved for use by the ITTF.

Once an adhesive system is applied to a rubber the player must decide when to attach it to the face of the blade. Some players choose to put the glue on when it is wet, others when it is dry, and still others wait until some degree of tack is present. A speed glue or non-speed glue also generally is used on the blade. The adhesive bond is considered to be based on a contact cement. As a consequence of the swelling of the sponge by the solvents in the speed glue, the sheet of rubber often curls upwards from the blade to such an extent that the rubber sheet does not adhere over its entire surface to the blade. Virtually all speed glues will curl the rubber to some extent. In fact, the degree of curl is used by players as an indicator of the potential performance of the sheet. Significant curling is a serious problem for a player as the performance of the sheet will be impaired. A number of the illegal and legal glues exhibit a tendency to have insufficient adhesive bond strength to adhere the curled sheet flat on the blade.

The length of time that a speed glue effect lasts and the consistency of its performance over a time period are critical parameters for a player. Many tournaments last for twelve hours or more. With the best prohibited speed glues, players have to reglue every two to three hours. Players therefore must reglue up to six times a day. In addition, there is a waiting period before one can use a speed-glued racket as it takes a certain amount of time before the full effect is present. With the new breed of ITTF speed glues the effect is generally longer, up to about five hours or more. This is certainly one of the main advantages of the new speed glues for the average player. However, for the World Class Player the maximum effect from the allowed glues is only an hour long, barely enough time to complete a long match (assuming a thirty-minute warmup period prior to the match). Also, the waiting period before the speed glue effect is present is somewhat longer (up to one hour) than with the prohibited glues (approximately 30 minutes). Therefore, it is difficult for the player to achieve consistent performance from the equipment in tournament conditions which often have unpredictably scheduled events.

The following summarizes the disadvantages of the present ITTF-approved speed glues: (1) their speed/spin performance characteristics are below the original, and now prohibited, trichloroethylene, 1,1,1-trichloroethane, toluene, hexane, etc. based glues; (2) they require an initial thick layer of glue to achieve maximum performance; (3) they typically employ a relatively high amount of solids which contributes to premature glue buildup problems and reduced rubber lifetime; and (4) the speed-gluing process can be an art which requires that players have a considerable base of personal experience and knowledge.

Although the prohibited speed glues previously set the standard for the industry, they also have disadvantages. These can be summarized as follows: (1) they employ potentially harmful solvents, many of which have been banned altogether for health and environmental reasons in certain parts of the world; (3) the speed glue effect lasts for only 2 to 3 hours; and (3) although they dramatically increase the speed, spin, and for some shots the control of the table tennis rubber, for some players control is difficult to maintain.

SUMMARY OF THE INVENTION

The present invention provides solvent systems, and adhesive systems comprising such solvent systems, that address the short-comings of prior inventions, and which satisfy a need in the art of table tennis for new, improved speed glue solvent and adhesive systems. One embodiment of the present solvent systems comprises from about 10 percent to about 60 percent by weight (all percents stated herein are percents relative to the total weight of the composition, unless stated otherwise), preferably from about 20 percent to about 50 percent of a cycloalkane having from about 5 to about 10 carbon atoms, from about 5 to about 40 percent, preferably from about 7 to about 22 percent, of an ester having from about 3 to about 10 carbon atoms, and from about 2 to about 20 percent, preferably from about 3 to about 10 percent of a terpene having a molecular weight of from about 110 to about 160. The cycloalkane generally is selected from the group consisting of cyclopentane, cyclohexane, and cycloheptane, with cyclohexane being a currently preferred cycloalkane. A currently preferred ester is ethyl acetate, and a currently preferred terpene is limonene.

The solvent system also may comprise other materials to adjust the properties of the solvent system. For example, the solvent system may further comprise from about 2 to about 15 percent, preferably from about 2 to about 6 percent, of an ether. Currently preferred ethers are dipropylene glycol dimethyl ether and propylene glycol methyl ether acetate. The solvent system also may include from about 8 to about 70 percent, preferably from about 15 to about 60 percent, of an aliphatic alkane, or mixtures of alkanes, having from about 5 to about 10 carbon atoms or fewer. A primary purpose for using the aliphatic alkane is to adjust the vapor pressure of the solvent system; therefore the aliphatic alkane is generally used in sufficient quantity to adjust the vapor pressure of the solvent system to be from about 50 mm/Hg to about 100 mm/Hg at 25° C. Suitable aliphatic alkanes include heptanes (i.e., n-heptane, branched heptanes, and mixtures thereof) and 2,2,4-trimethylpentane.

A currently preferred solvent system for use in combination with a speed glue suitable for speed gluing a table tennis rubber to a table tennis blade comprises (a) from about 20 to about 50 weight percent of a cycloalkane selected from the group consisting of cyclopentane, cyclohexane, cycloheptane, and mixtures thereof, (b) from about 7 to about 22 weight percent ethyl acetate, and (c) from about 3 to about 10 weight percent D- or L-limonene. The preferred solvent system also may comprise from about 2 to about 6 percent of an ether, such as dipropylene glycol dimethyl ether and/or propylene glycol methyl ether acetate, and from about 15 to about 60 weight percent 2,2,4-trimethylpentane.

The present invention also provides adhesive systems for use in forming speed glued table tennis rackets. The adhesive system comprises the solvent systems described above, and from about 2 to about 10 weight percent solids suitable for speed gluing table tennis rubbers to table tennis blades.

A method for speed gluing a table tennis racket also is described. The method generally comprises forming a solvent or adhesive system as discussed above. The solvent or adhesive system is then applied to a table tennis rubber, a table tennis blade, or both, wherein the rubber and/or the blade provide sufficient adhesive to adhere the rubber to the blade. The rubber is then attached to the blade to form a speed-glued table tennis racket.

Accordingly, there are several objects and advantages of the present invention which address the limitations and disadvantages of the known speed glues.

A first object is to provide a table tennis rubber speed glue which has speed/spin and control performance characteristics equal to or better than previously allowed (but now prohibited) speed glues and currently allowed speed glues on the market.

Another object is to provide a speed glue which maintains its performance enhancement effect for a period of up to about six hours.

Still another object is to provide a speed glue based on environmentally safe solvents.

Still another object is to provide a speed glue and pure solvent based attachment system which provides minimal glue buildup.

Another object is to provide a speed glue and pure-solvent-based attachment system which has superior tack to reduce the attachment problems resulting from sheet curling.

Still further objects and advantages will become apparent from a consideration of the ensuing description of the invention.

DETAILED DESCRIPTION OF THE PREFERRED EMBODIMENTS

I. General Discussion of the Speed Glue Phenomenon

Although Speed Glues are used by hundreds of thousands of table tennis players throughout the world, there currently appears to be no coherent theory that adequately explains the phenomenon. Falicoff's *Study and Development of a Non-Toxic Glue and Equivalent Table Tennis Rubber Sheet*, United States Olympic Grant paper, #S93-018-A-TT (1993), discussed the effect that solvent doping of table tennis sponge has on its dynamic storage, loss modulus and tan delta values. A number of DMA tests were carried out at low frequencies (up to 100 Hz) comparing sponge doped with trichloroethylene and regular sponge. Falicoff found that solvent-doped sponge has higher dynamic storage modulus (up to 30% higher), lower loss modulus and tan delta values than its non-doped version over the frequencies studied. However, no theory as to why this phenomenon occurs was presented. Other papers concerning the effect that Speed Glue has on table tennis rubber have been published by the ITTF. However, these scientific papers have not postulated a theory as to why the solvents perform such a function.

A. Prohibited Original Speed Glues as Standards

The now prohibited, original speed glues were used as standards for testing the present solvent and adhesive systems. Studies have been made regarding the performance of trichloroethylene-based table tennis speed glues versus embodiments of the present solvent and adhesive systems because the trichloroethylene-based speed glues had the previous best performance characteristics.

B. Physical Characteristics of Solvents and Adhesive Systems

As stated above, no theory apparently has been established as to which properties of a solvent are the most relevant for the speed glue phenomenon. However, the following were deemed significant and were considered for developing the present solvent and adhesive systems: (1) vapor pressure between 20 to 25° C.; (2) molecular weight; (3) melting point; (4) Hansen solubility parameters, including a solvent's non-polar, polar and hydrogen bonding numbers; (5) density; (6) dynamic, kinematic viscosity and surface tension; and (7) ability to swell table tennis rubber sponge.

II. Solvent Systems

The present invention provides solvent systems that have proved superior to conventional allowed speed glue solvents, as well as adhesive systems that comprise such solvent systems. Most solvents having vapor pressures significantly higher or lower than 60 mm at 20° C. do not work satisfactorily on their own for forming the present solvents (as discussed below, one exception to this is the monocyclic terpenes, eg., D-limonene). Solvent systems with vapor pressures of from about 50 mm/Hg to about 95 mm/Hg, preferably from about 60 mm/Hg to about 70 mm/Hg at 20° C., work best. Furthermore, mixtures of solvents generally have proved most efficient in maximizing the speed glue effect, especially if one of the solvents has Hansen solubility parameters similar to natural rubber or polyisoprene, non-polar compounds, and the other solvent has solubility parameters compatible with calcium carbonate (the primary filler used in table tennis rubber sponge), a polar compound. Two solvents which meet these criteria are cycloalkanes (nonpolar) and esters (polar), particularly aliphatic esters. However, there are particularly good results if the solvent systems of the present invention comprise a cycloalkane, an aliphatic ester, a terpene, an ether and an aliphatic alkane (the primary purpose of the aliphatic alkane is to adjust the vapor pressure of the solvent mixture). Each of these components is discussed in more detail below.

A. Cycloalkanes

Cycloalkanes have proved especially suitable for forming the solvent systems of the present invention. Currently, it is believed that cycloalkanes having from about 5 carbon atoms to about 10 carbon atoms, and preferably from about 5 carbon atoms to about 7 carbon atoms, such as cyclopentane, cyclohexane and cycloheptane, provide good results, with cyclohexane being a currently preferred cycloalkane, although cyclopentane can be used as a replacement, or partial replacement, for cyclohexane to increase the vapor pressure of the solvent system.

B. Aliphatic Esters

The aliphatic (acyclic, open-chain compounds) esters also appear to work well for forming the present solvent systems.

Suitable esters generally have from about 3 to about 10 carbon atoms total, although other esters may work too, as long as such esters provide a solvent composition having the properties described herein. Examples of suitable esters include butyl acetate, which has a melting point close to polyisoprene, and ethyl acetate. A currently preferred ester is ethyl acetate.

It also has been determined that the cycloalkane and the aliphatic ester may form binary azeotropic mixtures. Such mixtures are postulated to enhance the beneficial attributes of the present systems. Research performed by Dow Chemical on behalf of the inventors of the present invention indicated that solvent blends based on mixtures of cyclohexane and ethyl acetate behave as azeotropic solvent mixtures. Thus the vapor pressure of the azeotropic binary, cyclohexane and ethyl acetate, or solvent mixtures containing this azeotropic binary, cannot be calculated using Raoult's law. Calculations indicate that the vapor pressures of the components of the azeotropic binary are somewhat additive at a particular temperature. In addition, this azeotropic binary buffers changes in the vapor pressure of a range of solvent blends (based on the above mentioned solvents), even over an extended period of time when the process of evaporation changes the ratio of the components. A sample set of calculated values, presented below in Table 1, illustrates the effect this binary has on vapor pressure at 25° C. in mm/Hg of a representative sample of solvent blends. For purposes of comparison, trichloroethylene has a vapor pressure at 25° C. of 69.7 mm/Hg.

TABLE 1

| % Cyclohexane | % Ethyl acetate | % D-Limonene | % DMM | % PMA | Vapor Pressure mm/Hg |
|---|---|---|---|---|---|
| 45 | 45 | 5 | 5 | 0 | 120.8 |
| 40 | 40 | 10 | 10 | 0 | 111.9 |
| 30 | 30 | 20 | 20 | 0 | 90.7 |
| 45 | 45 | 5 | 0 | 5 | 120.4 |
| 40 | 40 | 10 | 0 | 10 | 111.4 |
| 30 | 30 | 20 | 0 | 20 | 91.0 |
| 56 | 24 | 10 | 10 | 0 | 99.0 |
| 64 | 16 | 10 | 10 | 0 | 95.1 |
| 48 | 32 | 10 | 10 | 0 | 101.2 |
| 52 | 22 | 12.5 | 0 | 12.5 | 95.1 |
| 60 | 15 | 12.5 | 0 | 12.5 | 91.9 |
| 45 | 30 | 12.5 | 0 | 12.5 | 96.7 |

DMM = dipropylene glycol dimethyl ether and PMA = propylene glycol methyl ether acetate In all the above examples as the ratio of cyclohexane to ethyl acetate is increased, the vapor pressure is lowered but not by a significant amount. If the concentrations of DMM and PMA are constant, then the range of values given in Table 1 differs by approximately 16 mm/Hg. As the percentage of the binary in the mixtures is reduced, the vapor pressure is lowered. By adjusting both the ratio of the cyclohexane to ethyl acetate and the ratio of this binary to other solvents, a desired vapor density can be obtained.

It should be clear that other possible solvent combinations could also be chosen which meet the criteria stated herein for forming the present solvent mixture. Individually, neither the cycloalkane or the aliphatic ester has much of a speed glue effect. Solvent systems comprising from about fifty to about eighty parts cycloalkane relative to the total amount of aliphatic ester, and preferably about seventy parts, have good speed glue effects.

C. Terpenes

The cycloalkane/aliphatic ester binary may be useful as a speed glue solvent system. However, further improvements are provided when a third solvent with a molecular weight of from about 110 to about 160 and solubility parameters similar to polyisoprene is added to the mixture. The terpenes, including without limitation limonene, pinene, terpinene, (+)(-)terpinen-4-ol and (-)-terpinen-4-ol, have proved useful in this regard. For example, and without limitation, limonene (D-limonene has been used to form working embodiments of the present solvent systems; however L-limonene also may be used), with a molecular weight of 136.23, has exceptional rubber swelling characteristics and also has a low vapor pressure. Because of the low vapor pressure the swelling effect that is obtained with the terpenes lasts many times longer than trichloroethylene. Also, terpenes such as D-limonene add a certain degree of tack to the solvent blend when in contact with the rubber solids left over from previous gluings. D-Limonene also has excellent solvent properties for polyisoprene. By itself, it is a powerful solvent for table tennis sponge and works very well by itself or in combination with other materials used to form the present solvent and adhesive systems. D-Limonene has a Hansen hydrogen bonding parameter close to polyisoprene and has an extraordinary ability to swell the cells of table tennis sponge, facilitating the sponge's absorption of other solvents in the solvent system. D-limonene has a significantly lower vapor pressure than trichloroethylene. Therefore, it works even better in conjunction with solvents which have higher vapor pressures.

D. Ethers

The degree to which the rubber swells will have a substantial impact on the speed glue effect. The swelling effect of the present solvent systems can be enhanced by using an ether. Working embodiments of the present adhesive systems have used alkylene glycol ethers, such as dipropylene glycol dimethyl ether (DMM; molecular weight of 162.2) and propylene glycol methyl ether acetate (PMA; molecular weight of 132.2). These solvents are powerful, safe substitutes for trichloroethylene. Both of these ethers help the other chemicals in the solvent blend penetrate the sponge more quickly by acting as a dissociating agent. Without limiting the present invention to one theory of operation, it appears that the ethers decrease the drying time of the glue interface between the sponge and the blade. For example, without this type of agent, the D-limonene in the blend will soften a polyisoprene-based solids glue interface layer for an extended period of time, which is an undesirable result. However, like D-limonene these solvents work better in combination with other solvents which have a higher vapor pressure.

E. Aliphatic Alkanes

Finally, aliphatic alkanes can be added to the solvent system to adjust certain characteristics. For example, aliphatic alkanes can be added to the solvent mixtures to adjust the vapor pressure of the mixture to be from about fifty mm/Hg to about 100 mm/Hg. These aliphatic alkanes generally have 10 carbon atoms or fewer, and also can be both straight chains or branched. Working embodiments of the present solvent systems have used, for example, the aliphatic alkanes heptane, 2,3-dimethylpentane and 2,2,4-trimethylpentane to modify the molecular weight, vapor pressure and other important characteristics of the solvent systems. The result has been to produce solvent systems that have improved short and long term performance. Such aliphatic alkanes also appear to reduce the waiting period between the application of the solvent system to the rubber and when the table tennis racket can be used for play.

The preceding paragraphs provide specific guidance as to solvents, and solvent mixtures, that provide good results when used to formulate solvent systems for speed gluing rubber to table tennis blades. It will be apparent to a person of ordinary skill in the art that other solvents, and mixtures thereof, can be used. The following paragraphs provide guidance concerning the selection of additional solvents, and solvent mixtures.

III. Additional Factors to Consider for Selecting Solvents

A. Vapor Pressure and Molecular Weight

It was mentioned earlier that solvents with a vapor pressure similar to trichloroethylene work well. Tests carried out by the inventors with such solvents as toluene, xylene, hexane, naphtha and others indicate that solvents with slightly lower vapor pressure and molecular weight than trichloroethylene tend to increase the speed of the rubber but have reduced effect on the spin component. Solvents with vapor pressures somewhat higher than trichloroethylene and a lower molecular weight such as hexane also have a low spin component. One exception to this is D-limonene, which has a good effect with a low vapor pressure. This is probably due to its high molecular weight combined with a superb ability to swell the sponge.

Both vapor pressure and molecular weight are important parameters in designing solvent systems for speed glues, but are not absolute indicators of how well a solvent may work. Further, it appears that the speed and spin components of the phenomenon are sensitive to changes in the vapor pressure of a particular solvent or solvent blend. The vapor density of the solvent, which is directly related to its molecular weight times its vapor pressure, also appears to be an indicator of whether a solvent should be considered as a potential speed glue solvent. For example, Table 2 compares the vapor pressure, molecular weight and vapor density of a number of candidate solvents to trichloroethylene.

TABLE 2

| Solvent | V. Pressure at 25 C. in Kilopascals | Molecular Weight | VP × M Weight |
|---|---|---|---|
| Trichloroethylene | 9.27 | 131.4 | 1273 |
| Cyclohexane | 11.17 | 84.16 | 940 |
| Ethyl acetate | 10.87 | 88.11 | 958 |
| Toluene | 3.79 | 91.14 | 349 |
| N-Hexane | 18.54 | 86.18 | 1598 |
| D-Limonene | 0.15 | 136.23 | 20 |
| Blend A | 13.20 | 96.4 approx. | 1269 |

Looking at Table 2, one would expect that D-limonene would be the least likely solvent on the list to make a good speed glue solvent, as its vapor pressure and vapor density are considerably different from the values for trichloroethylene. This turns out not to be true. However, cyclohexane and ethyl acetate have vapor pressures close to trichloroethylene and are good solvents. The vapor density of applicants' preferred solvent system (see Example 1) is virtually the same as trichloroethylene.

A simple model can be postulated for the effect of vapor pressure on performance. One can consider the sponge to be a series of interconnected balloons in a close packing configuration. The higher the vapor pressure, the higher the stiffness of the balloons and the higher the static compressive modulus of the system (neglecting the softening and swelling effect on the sponge of the solvent). Table tennis rubber engineers know that changes in the static compressive modulus of the sponge component in a sheet of table tennis rubber have a dramatic effect on the spin/speed performance characteristics of a rubber. Rubbers comprising sponge having a low modulus generally do not impart spin to the ball as effectively as sponges having high modulus. As the modulus increases, spin (and speed) increase up to a point. Beyond a certain modulus threshold, the speed and spin of the rubber decreases unless modifications are made to the top sheet to allow for the increased stiffness of the sponge. Above a certain modulus, the sponge does not store very much energy and the dynamic properties of the rubber become virtually unusable for the modern game which is based on shots with high speed and spin.

B. Azeotropic Solvents and Vapor Pressure

Research by Dow Chemical on behalf of the inventors indicated that solvent blends based on mixtures of certain cycloalkanes and aliphatic esters, such as cyclohexane and ethyl acetate, behave as azeotropic solvent mixtures. Binary azeotropic mixtures may buffer changes in the vapor pressure of a variety of solvent systems, even over an extended period of time when the process of evaporation changes the ratio of the components. By adjusting both the ratio of the cycloalkane to the aliphatic ester, and the ratio of the azeotropic binary mixture to other solvents in the solvent systems, a vapor density similar to trichloroethylene, the previously best known speed glue solvent, can be obtained.

C. Melting Point

An important physical characteristic of a rubber compound is its so-called glass transition temperature, Tg. The glass transition temperature of a table-tennis rubber sponge has a direct bearing on the frequency-based playing characteristics of the sponge. Above a certain impact speed (high frequency impact), the rubber can reach the glass transition temperature and become temporarily embrittled. This commonly happens in the game of table tennis. The embrittling phenomenon can be either an advantage or a disadvantage to a player. However, the phenomenon is virtually unmentioned in the literature on the sport and is understood on an engineering basis only for other applications such as automotive tire design. The embrittling phenomenon may be useful for some shots, as it provides a top-end limit switch on energy storage at high impact speeds.

Table-tennis rubber sheets are designed with combinations of polyisoprene and polybutadiene which have respective glass transition temperatures of −75° C. and −85° C. According to Dr. Robert F. Ohm of R. T. Vanderbilt Inc., the solvent in the speed glue can modify the glass transition temperature of the sponge. The degree of modification would be based on the relative molar saturation of the solvent in the sponge, using the solvent blend melting point on an equivalent basis to the Tg value of the sponge. Table 3 compares the melting and boiling points of six of the solvents discussed above plus 2,2,4-trimethylpentane.

TABLE 3

| Solvent | Melting Point C | Boiling Point C. at 760 mm Hg |
|---|---|---|
| Ttrichloroethylene | −86 | 87 |
| Cyclohexane | 6.5 | 81 |
| Ethyl acetate | −95 | 69 |
| Toluene | −93 | 109.6–111.6 |

TABLE 3-continued

| Solvent | Melting Point C | Boiling Point C. at 760 mm Hg |
|---|---|---|
| Hexane | −95 | 69 |
| D-Limonene | −74 | 175–177 |
| 2,2,4-Trimethylpentane | −107 | 98–99 |

The melting point of trichloroethylene is virtually the same as the Tg of polybutadiene. The glass transition temperature of table tennis sponge is close to the value of polyisoprene or −75° C. Therefore, trichloroethylene decreases the glass transition temperature of the sponge, matching it more closely with the top sheet, which typically is composed of a compound comprising about 70% polyisoprene and 30% polybutadiene. With a melting point of −83.5° C., ethyl acetate is the closest match to trichloroethylene of the remaining solvents in the list. Interestingly, cyclohexane has a fairly high melting point. Cyclohexane should have a significant effect on Tg value of the sponge. D-limonene is the closest match to polyisoprene and would therefore have the least effect on the Tg value of the sponge. Hexane and toluene should lower the Tg even more than trichloroethylene. 2,2,4-trimethylpentane has the lowest melting point of the solvents in the list. Therefore, it is a useful safe solvent for lowering the glass transition temperature of the sponge. It currently is believed that solvents which inhibit the onset of the Tg increase the speed of the rubber at high impact speeds.

It is difficult to predict the effect on the spin component given a change in Tg. The best guess of the inventors is that the vapor pressure of a solvent or solvent blend has more effect on the spin than its melting point. This is corroborated by experiments employing the solvents hexane and toluene, which were found to increase the speed of rubber without helping its spin very much.

D. Hansen Solubility Parameters

Hansen solubility parameters are excellent indicators of the compatibility of a particular solvent or solvent blend with a rubber compound. Four numbers are usually given for a solvent and polymer: (1) the dispersion or non-polar parameter; (2) the polar parameter; (3) the hydrogen bonding parameter; and (4) the total parameter. Table 4 below provides Hansen values for the now prohibited trichloroethylene and toluene, polyisoprene and a few of the solvents used to form the solvent systems of the present invention.

TABLE 4

| Solvent | Non-Polar | Polar | Hydrogen Bonding | Total |
|---|---|---|---|---|
| Polyisoprene | 16.6 | 1.4 | −0.8 | 16.3 |
| Trichloroethylene | 18.0 | 3.1 | 5.3 | 19.0 |
| Toluene | 18.0 | 1.4 | 2.0 | 18.2 |
| Ethyl acetate | 15.8 | 5.3 | 7.2 | 18.1 |
| Cyclohexane | 16.8 | 0.0 | 0.2 | 16.8 |
| D-Limonene | 16.3 | 5.8 | 0.0 | 17.3 |
| PMA | 16.1 | 6.1 | 6.6 | 18.4 |
| DMM | 14.9 | 2.1 | 3.8 | |

Generally, the best solvents for use with a particular material are the ones with the closest Hansen numbers. Based on a comparison of the Hansen numbers both toluene and trichloroethylene are excellent solvents for polyisoprene. Toluene, which is prohibited, is one of the best solvents for polyisoprene. However, the filler used in the sponge is calcium carbonate, a relatively polar compound, and toluene is a relatively nonpolar solvent. This is probably why trichloroethylene, now prohibited, is such a good match for the sponge compound.

In order to provide solvent systems having good solvent characteristics using ITTF-allowed solvents, a mixture of two or more solvents, each with a particular set of properties, achieves excellent results that are equivalent to the now prohibited solvents. For example, a mixture comprising the cycloalkane cyclohexane and the aliphatic ester ethyl acetate has excellent characteristics for use as speed glue solvent systems. Ethyl acetate has good vapor pressure and melting point values for such use. However, by itself ethyl acetate is not a good solvent for polyisoprene. Cyclohexane also has good vapor pressure values and has a good affinity for polyisoprene. 50/50, 60/40, 40/60 or 70/30 mixtures of cyclohexane and ethyl acetate are very powerful solvent blends for polyisoprene. In addition, solvent mixtures comprising cyclohexane and ethyl acetate work well with polychloroprene-based (NEOPRENE) solids.

In summary, good speed glue results are obtained by employing solvent mixtures, such as mixtures comprising an aliphatic alkane, such as dimethylpentane, trimethylpentane, heptane or mixtures thereof, a cycloalkane, such as cyclohexane or cyclopentane, esters such as ethyl acetate and butyl acetate, terpenes such as D-limonene and ethers, all of which have Hansen properties closer to polyisoprene than trichloroethylene.

Computer simulation of various solvent blends was carried out using proprietary computer software. Numerous blends were evaluated with regard to vapor pressure and Hansen Solubility Parameter as a function of time. For example, the Hansen solubility parameters for the solvent mixtures described in Examples 1 and 2 are provided below in Table 5, wherein 45/45/10 refers to the parts of cyclohexane, ethyl acetate and D-limonene, respectively. 56/24/10/10 refers to the parts of cyclohexane, ethyl acetate, D-limonene and dipropylene glycol dimethyl ether, respectively.

TABLE 5

| Solvent | Non-polar | Polar | Hydrogen-bonding | Total |
|---|---|---|---|---|
| 45/45/10 | 16.33 | 2.79 | 3.10 | 16.86 |
| 56/24/10/10 | 16.36 | 1.92 | 2.04 | 16.60 |

The non-polar parameters for both of the solvent systems of Table 5 are an excellent match to polyisoprene and a somewhat better match than trichloroethylene. The polar component of the first solvent system listed in Table 5 is very similar to trichloroethylene, while that of the second solvent system listed in Table 5 is very close to toluene. The hydrogen bonding numbers are in between toluene and trichloroethylene. Vapor pressures of the solvent systems are somewhat higher than trichloroethylene over the useful lifetime of the study. Based on this analysis these solvent blends should have excellent characteristics. Actual tests corroborated this theory.

Although these computer studies concerning Hansen properties are useful for establishing candidate solvent systems, actual testing by experienced table tennis players was found to be the best, most reliable method for evaluating solvent systems. For example, based on the close match of the Hansen parameters for the solvent cyclohexane with polyisoprene, combined with cyclohexane's good vapor pressure value, the solvent would be expected to work well in this application on its own. However, it was found that cyclohexane does not work particularly well on its own. One possible explanation for this is the high melting point of cyclohexane and its effect on the glass transition temperature of the sponge.

E. Molecular Modeling for the Substitute Solvents

Hansen values reflect the contributions of functionalities in the molecular structure on solvent properties. The spatial arrangement of these functionalities is also important. The main functional groups affecting polarity (degree of charge) are the highly polar groups (hydroxyl, carboxylic acid, and amino groups), weakly polar (unsaturated bonds and esters) and non-polar substitutes. Both polyisoprene and the preferred substitute solvents have unsaturated bonds (or esters) that convey moderate polarity. The ester group of the aliphatic esters, such as ethyl acetate, and the ether functional group of the aliphatic esters convey significant hydrogen bonding effect. The remainder of polyisoprene, and all substitute solvents discussed herein, consist mostly of non-polar, alkyl bonds. Applying the general rule of like-attracts-like, the substitute solvent system components are all sufficiently similar to each other and polyisoprene that they freely mix with each other and solvate polyisoprene rubber.

When one examines the spatial arrangement of functionalities, the similarities between D-limonene and polyisoprene are particularly strong. Molecular models show that D-limonene has a very similar arrangement of double bonds and alkyl groups to polyisoprene, allowing d-limonene to "fit" easily between polyisoprene molecules. This helps explain why D-limonene is an excellent swelling agent by itself even though it has a low vapor pressure. The same arguments also help explain why solvent systems comprising D-limonene are effective with NEOPRENE-based solids.

F. Density

For a given impact speed, a comparison of two rackets having identical characteristics except for racket weight, the heavier racket will impart greater speed to a ball than the other. Speed glue solvent systems and adhesive systems increase the weight of the racket, thereby increasing the potential speed of the equipment. Solvents having higher densities will have more of an effect per unit volume than solvents with lower densities. Trichloroethylene is unusual in that it has a relatively high density (1440 kg/m$^3$) with a high vapor pressure. In comparison, toluene (867 kg/m$^3$), hexane (660 kg/m$^3$), cyclohexane (779 kg/m$^3$) and ethyl acetate (900 kg/m$^3$) have considerably lower densities.

Up to 6 to 10 grams of glue per sheet can be applied to the sponge in the speed glue process with most solvent blends. Therefore, the effect of density variation of various solvents on the performance of speed glued rubber is considered to be a minor issue, especially since the player can adjust the overall weight of the racket by using a different weight blade.

G. Sponge Swelling

Increasing the thickness of the table-tennis rubber sponge modifies the performance characteristics of the rubber. The thickness of table tennis sponge typically varies from about 1.5 mm to about 2.5 mm. Solvent-based speed glues swell the sponge and increase its thickness by from about 3% to as much as about 10%. This in itself is one of the main reasons why the speed glue has such a dramatic effect on performance. With increased thickness the speed imparted to the ball by the rubber increases. However, if the sponge swells too much it may not impart as much spin to the ball, especially if the sponge tensile and compression Modulus values are reduced. B. Erman and J. E. Mark discuss the effect of solvent swelling on rubber modulus values (See, *Science and Technology of Rubber,* 2nd Edition, J. E. Mark, B. Erman, F. R. Eirich, Academic Press, pp. 201–206, 1994). For small deformations the compressive modulus is increased. Beyond a certain point for a given rubber material, solvent and solvent loading, the modulus values are reduced. However, this information does not provide any insight as to the effect of solvent swelling on modulus during dynamic deformation. Based on the observed behavior of speed glued rubber, the inventors expect that under high frequency impacts the rubber/solvent network would behave as if there is little effective deformation of the sponge (there is less time for deformation shock waves to interact intermolecularly) and one would expect that the modulus values would remain high, and probably higher than the dry network. For low frequency impacts with relatively large deformations, the modulus for the "phantom network" would be lower than the dry network, and the Mooney-Revlin theory for large deformations would apply.

ITTF rules mandate maximum overall thickness values of sponge for various types of rubber. Therefore, it is imperative that the speed glue not expand the sponge too much or the rubber will be prohibited.

A number of the terpenes, including D-limonene, are ideal solvents for table tennis sponge as they swell the sponge to a similar extent as the trichloroethylene-based speed glues. Manufacturers have used this swelling data to establish thickness specifications for meeting the above-mentioned ITTF rules.

The degree to which a solvent blend will plasticize the sponge will affect the performance of the sponge. Plasticizing will affect many sponge properties including its hardness, modulus and resilience. While a certain degree of solvent plasticizing would be beneficial to speed glue effect, beyond a certain point the effect will hurt the sponge, as the material literally could fall apart.

In conclusion, a solvent's ability to swell the sponge is a primary property in the speed glue effect and can be more important than its vapor pressure. This is corroborated by the studies using pure D-limonene which showed excellent speed glue properties by itself.

H. Cavitation and Water Hammer Effects

Table tennis shots made with speed glued rubber have a characteristic very loud pop sound, considerably louder and different from those made with normal rubber. Two possible explanations of this sound are that the solvent/solvent gas system is either undergoing a phase change during the impact, i.e. cavitation is occurring, or the sponge/gas matrix noise occurs as a result of the water hammer effect. If cavitation occurs this could explain the significant boost in performance of the speed glued sponge as the explosive forces would literally propel the sponge tangentially and outward.

Cavitation is a phenomenon well understood in the field of fluid dynamics and occurs in many types of high velocity fluid based machines such as pumps. It occurs when a moving fluid encounters a region of low pressure which is equal to or below the vapor pressure of the fluid. Under these conditions a number of vapor pockets are formed. When the fluid stream enters a region of high pressure these vapor pockets collapse back into a liquid. A partial vacuum occurs in the region around the droplet of fluid. The force generated (typically measured in gigapascals) can rip metal off the walls of a piece of machinery. This phenomenon occurs over a period of a few milliseconds and is transmitted as a shock wave through the media. The force is particularly strong at points nearest to the collapse of the vapor.

The water hammer effect occurs when there is an abrupt change in the velocity of a moving fluid or gas. A good example of this occurs in the plumbing of a home, when a running water faucet is turned off suddenly and quickly. A loud noise is heard throughout the home's plumbing system. At the time of the faucet being turned off the water molecules directly against the faucet are stopped from moving. The water molecules some distance away from the faucet continue to move toward the faucet and compress the fluid. The pressure thus induced stresses the walls of the pipe throughout the house and a large noise ensues.

The water hammer effect can occur in many types of media including fluids and gases. Theoretically it can occur in a very elastic solid such as a solvent doped sponge, given the right dynamic movement conditions.

Of the two, the cavitation effect is the most interesting phenomenon, as it points to an elegant way of increasing the performance of table tennis rubber. The application of this principle would work as follows. Table tennis rubber sponge is composed of a network of cells with small voids approximately 0.05 mm in diameter. Let us assume that these voids are filled with a suitable vapor and the solid network is swelled and partially plasticized. During a high frequency impact these cells would be highly compressed and distorted. For impacts of small duration, the gas in a majority of the cells would not have time or the ability to escape. As the volume of the cells shrinks, both the pressure and temperature would increase. Under certain impact conditions, the pressure/temperature regime would be such that the pressure would be equal to or greater than the current vapor pressure at the new elevated temperature and the gas would phase change to a liquid. Implosion would occur due to the vacuum created and the cells would shrink in size even more. As the ball rebounds from the sponge and the cell expands, there will be a condition in which the pressure drops below the current vapor pressure of the solvent and the droplet of solvent will phase shift back to a gas. Assuming that this is in fact what happens to speed glued rubber, there is a potential for a noise to occur during the time when the gas changes to a liquid and also when it reverses back to a gas. Analysis of acoustic recordings of the phenomenon should reveal whether indeed there are two distinct sounds; an implosion and explosion sound. Energy will be stored over a few milliseconds and released in the two phase change cycles into the sponge over a very short time period. If the system works as envisioned, the player should theoretically be able to make contact with the ball at a slow impact speed and achieve a high velocity/spin shot. This is in fact exactly what happens with speed glued rubber. The top players can achieve very high velocity and spin shots without much apparent hand speed or effort.

The cavitation index is used by engineers in a number of fields to predict whether there is a possibility that cavitation might occur at a certain point in a fluid stream, in a particular type of equipment, such as a pump. The cavitation index, $C_i$, can be defined as follows:

$$C_i = [P_o - P_v]/[(D/2)V_o^2]$$

where, Po is the pressure at the point in question, Pv is the vapor pressure of the fluid, D is the density of the fluid, and Vo is the velocity of the fluid at the point in question.

The Cavitation Index equals zero when the local pressure is equal to the vapor pressure of the fluid. At this point the fluid will boil. At values greater than zero, cavitation can still occur. However, the number is usually established from empirical data. For example, a particular piece of equipment might have cavitation problems when the cavitation index is less than 0.1. However, it should be clear from this equation that cavitation is more likely to occur where there is a high velocity and density fluid involved.

In the case of the speed-glued sponge most of the solvent will become a vapor in the walls of the sponge. Therefore, the cavitation phenomenon would initially occur as a change from a vapor to a liquid and then back to a gas. If one could establish cavitation indices for this phenomenon, one could then evaluate the effect that the vapor density, pressure and velocity of a particular solvent blend has on the process. Cavitation is also affected by the surface tension of the fluid, as a low surface tension fluid can more easily move through small orifices/voids.

It was found that slight modifications to the ratio of the components of the solvent blends had a major effect on the "sound" of the glued rubber. 2,2,4-trimethylpentane was found to increase the "sound" of the preferred solvent systems when used in the range of about 18 to about 22 parts (by weight) of the total mixture. An explanation of this is that the vapor pressure of this solvent is lower than the azeotropic binary, cyclohexane and ethyl acetate. Thus the 2,2,4-trimethylpentane brings the vapor pressure of the solvent blend closer to the value of trichloroethylene. In addition, the molecular weight of 2,2,4-trimethylpentane is 114.23, somewhat higher than either cyclohexane and ethyl acetate. Looking at the formula for the cavitation index, using 2,2,4-trimethylpentane in the solvent systems will lower the numerator and likely increase the denominator of the formula, which will make the solvent blend more likely to cavitate.

In summary, the solvent systems described herein are a novel substitute for trichloroethylene or toluene in table tennis speed and spin enhancement solvent and adhesive systems. Although alkanes, cycloalkanes, esters, unsaturated and many other solvents now permissible by the ITTF have previously proved unsuitable, mixtures of these in the right proportions are eminently suitable. By choosing appropriate solvents, a synergistic mixture can be created which has properties equal to or better than trichloroethylene and toluene.

IV. Ratio of Solvents in the Solvent Systems

The relative effect on speed/spin and longevity of the solvent blend on various kinds of table tennis rubber can be adjusted by manipulating the weight percents of the components of the solvent systems. These weight percents are as follows;

(1) the cycloalkanes generally are used in weight percents ranging from about 10 percent to about 60 percent, preferably from about 20 percent to about 50 percent;

(2) the esters generally are used in weight percents ranging from about 5 percent to about 40 percent, preferably from about 7 percent to about 22 percent;

(3) the ratio of the cycloalkane to the ester, such as the ratio of cyclohexane to ethyl acetate, generally is from about 70:30 to about 50:50;

(4) the terpene should comprise less than about 30 percent, generally from about 2 percent to about 20 percent, and preferably from about 3 percent to about 10 percent;

(5) the ether generally comprises less than about 15 percent, by weight, of the total solvent mixture, such as from about 2 percent to about 15 percent, and preferably from about 2 to about 6 percent;

(6) the aliphatic alkane generally comprises from about 8 percent of the total solvent mixture to about 70 percent, and preferably from about 15 percent to about 60 percent.

Additional discussion concerning the compositions of the present solvent systems is provided below in the Examples.

V. Adhesive Systems

The previous paragraphs discussed the composition of speed glue solvent systems. The solvent systems can be used alone to attach a rubber to a table tennis blade if a glue layer already exists on the sponge. Another approach is to formulate adhesive systems comprising the solvent systems discussed above. In general, all solids conventionally used to adhere rubbers to blades can be used. Other solids also may be suitable. Working embodiments of the present adhesive systems generally have used solids and have mixed such solids with the solvent mixtures. By way of example only and without limitation, the following commercially available solids have been combined with the solvent systems discussed above to form working adhesive systems: (1) Goodyear NATSYN 2200 (cis 1,4-polyisoprene; CAS No. 9003-31-0), Goodyear WINGTACK 95 Resin (a synthetic polyterpine resin; CAS No. 26813-14-9) or Hercules PENA-LIN H, and Goodyear WINGSTAY L-HLS Antioxidant (a polymeric hindered phenol, 4-methyl phenol reaction products with dicylopentadiene and isobutylene); (2) R T Vanderbilt NEOPRENE AD, Magnesium Oxide, Akrochem Transparent Zinc Oxide Akrochem ZDBCX, Zinc N,N-di-n-butyldithiocarbamate: di-n-butylamine complex, and R T Vanderbilt AGERITE SUPERLITE [Antioxidant, a combination of three compounds, namely (a) polybutylated bisphenol A, CAS No. 68784-69-0, (b) triisobutylene, CAS No. 7756-94-7, and (c) diisobutylene, CAS No. 25167-70-8].

VI. Making Solvent and Adhesive Systems

The solvent and adhesive systems discussed above generally can be made simply by combining the solvent components to form solvent systems, combining the solid components, and thereafter combining the solvent systems with the solid components to form the adhesive systems. The adhesives can be made in small quantities without having to mill the solids. The solvent systems generally have been combined with the solids using an automated mixer, such as a paint shaker (Red Devil or equivalent), for a period of time to provide adequate mixing for subsequent application to the rubber and/or blade. Working embodiments of the invention have continued the mixing by the shaker for a period of about an hour. It currently is believed that the best results are obtained when the adhesive systems so formed have viscosities of from about 200 cps to about 400 cps. Mastication of the materials may increase the viscosity of the adhesive systems. Further modification of the viscosity of the adhesive can be accomplished by employing a filler such as amorphous or precipitated silica.

VII. Speed Gluing Table Tennis Rackets

Experience has shown that to achieve the maximum performance from regluing, a fresh sheet of rubber needs to be "primed" before it can be reglued. This entails putting two or three thin layers of speed glue on the sponge prior to its use on the racket. Each of the layers should be allowed to dry completely before placing another layer on the sponge. After the final priming layer is dry, it is best to wait at least eight hours and preferably twenty-four hours before the sheet is ready for regluing and putting on a racket. One reason for this is that the glue solids (as opposed to the solvents, which evaporate), need a number of hours to develop a stable strong bond with the sponge. If one does not wait a long enough time for the solid layer to bond, the spin component of the rubber will be reduced and the sheet may not stick to the racket face securely.

A. Priming the Rubber for Regluing

To achieve the maximum performance from regluing, a fresh sheet of rubber needs to be "primed" before it can be re-glued. This entails putting two or three thin layers of speed glue on the sponge prior to its use on the racket. Each of the layers should be allowed to dry completely before placing another layer on the sponge. After the final priming layer is dry, it is best to wait at least 8 hours, and preferably 24 hours, before the sheet is ready for regluing and putting on a racket. One of the reasons for this is that the solids of the adhesive system (as opposed to the solvent, which evaporates), needs a number of hours to develop a stable, strong bond to the sponge. If used before the solid layer has bonded, the spin component of the rubber will be reduced and the sheet may not stick to the racket face securely.

One easy way to judge the amount of glue to place on the rubber is to pour an amount out onto the center of the sheet. The diameter of the circle tells the amount of glue being used very accurately. For priming sheets, a circle of glue of about 1.5 inches (35 mm) in diameter can be used for each priming. Another technique is to count the number of times a brush is dipped into a can. The diameter method is better, however, as it is easy to remember and judge.

B. Amount of Glue to Use on the Sponge

A major consideration for the player when deciding how much glue to apply is how much performance boost is required. To achieve a minimum effect, the diameter of glue applied should be at least 1.5 inches (35 mm). The rubber should dome up in a few minutes. The height of the dome depends on a number of factors, including: (1) the softer the sponge, the higher the dome; (2) the thinner the glue build-up, the higher the dome; (3) the thinner the sponge thickness, the higher the dome; and (4) the higher the air temperature, the higher the dome.

The height of the dome is a very good indicator of the potential performance of the sheet. However, a sheet does not always require a big dome to have a performance boost. With experience it is possible to judge from the dome size which effect is likely to occur from a particular amount of glue used. In some circumstances the amount of glue must be adjusted to achieve the same dome. For example, if the sheet has a large glue build-up, more glue may have to be applied than normal to achieve the same dome and therefore the same performance as in previous gluings. This is also true of gluing in cold temperature conditions.

There are a number of doming stages that a rubber sheet can go through, including: (1) a mild dome—having a height of approximately 1" (25 mm); (2) a medium dome—having a height of approximately 2" (50 mm); (3) a high dome, wherein the sheet develops heavy curl; and (4) an extreme dome, wherein the sheet curls up into a tube.

To achieve a big speed glue effect versus a mild effect more glue needs to be applied. However, instead of putting on a large amount of glue at one time, more than one application of glue should be applied, and then one must wait until the rubber has achieved its maximum dome after approximately five to seven minutes. If the dome is not sufficient, another layer of glue needs to be applied using a glue diameter of about 1.5 inches (35 mm) for each application. On sheets which already have a considerable glue build-up, maximum performance can be achieved by using the solvent systems alone, instead of the adhesive systems.

In order for the rubber sheet to stick properly on the blade, a fresh layer of glue needs to be applied on its face. The amount of glue needed depends on a number of factors, including: (1) whether or not the blade has been used before; (2) whether the face is rough or smooth; and (3) whether a sealer has been put on the face and, if so, the type of sealer employed.

For a previously used blade having an average roughness, start with a circle of glue about 1 inch (25 mm) in diameter. Brush the glue over the entire face evenly. If there are any dry spots cover them with glue, obtaining the glue by dipping the brush into the bottle. If it appears that edges might curl, cover the edges with a second application of glue by the dip method.

On a brand new blade, apply two thin even coats of glue. The first coat should be allowed to dry before applying the second coat. If the sheet does not sticking properly with a 1" (25 mm) circle of glue, then with the next gluing increase the amount to 1.5 inches (35 mm). If the blade has been sealed, it may have to be lightly roughened with fine sandpaper to get the sheet to stick properly.

C. Wet Versus Dry Application

With some speed glues of the past, a number of players put the glue on when it was still wet. This is not recommended with the present solvent and adhesive systems as it reduces the spin component of the rubber. With the wet application, players may have to wait up to an hour before the normal spin component is achieved. This approach could also prevent the sheet from reaching the maximum dome, which can affect the control and feel of the rubber. For the present solvent and adhesive systems, best results appear to occur when the sheet is adhered when it is tacky but dry.

D. Putting the Rubber on the Blade Too Early

If a sheet is put on before it has fully expanded or domed, this can negatively affect the playing characteristics of the rubber. The speed/spin performance of the sheet will be reduced and the rubber may have a dead "cardboard" feel. This can occur for a number of reasons, including gluing the rubber in a cold environment, or not waiting long enough for the sheet to fully dome.

If for any reason the rubber is not playing up to normal standards and it is suspected that the sheet was put on without being fully domed, all is not lost. Continue to play with the racket, and after approximately twenty to forty minutes of play, remove the sheet and glue it on again. Playing with the rubber for this period of time activates the chemicals in the sponge and causes the sheet to dome. It is not unusual to see a significant increase in the dome size immediately after it is removed from the racket, compared to the way it was when first put on. When regluing the second time, the likely result is a second increase in dome size from even a small amount of glue. As a result, only a small amount of glue is needed on the rubber and the blade, i.e., just enough to cover both surfaces.

E. How Often to Reglue

How often to reglue depends to a large extent on the performance level desired. Many players will find that one regluing will last the length of a day-long tournament (assuming it is eight hours long). This is especially true if the racket was glued heavily the first time. However, regluing every three to four hours appears to provide the maximum effect. In a two-day tournament, the present solvent and adhesive systems will have a considerable residual effect from the first day to the second day. Therefore, less glue will be needed the second day to achieve the same performance as the first day. Some players have reported that the glue effect lasted up to forty-eight hours after regluing three times in a single day.

F. Performance Changes Over Time

The present solvent and adhesive systems were designed to have a constant performance for a long period of time. However, performance variation varies over time, at least to some extent, and the player should anticipate this occurrence to establish the timing of regluing for tournament play.

For the first half hour after regluing there will be an increase in speed with a lesser degree of spin increase. After approximately thirty minutes the spin/speed component will be balanced and should remain at this balance for the next few hours. This is the ideal time for tournament play. This period of time can be reduced by warming up with the racket while it is in the high speed mode. After approximately three to four hours, the speed component of the rubber will decrease (slightly to moderately depending on the conditions) while the spin component will remain high. Some players may find this performance balance more to their liking. For an early morning tournament match this state can be achieved by regluing the racket heavily the night before and putting it in a racket press.

If the reglued rubber does not have enough spin or speed, it also may be that the sheet was put on too wet. If this is suspected, continue play with the sheet for another forty minutes. If there is no improvement in performance reglue the sheet.

G. When to Remove the Rubber From the Blade

Typically, it is beneficial to remove the reglued rubber sheet immediately from the blade after finishing playing. The reason for this is that the expanded sheet wants to shrink and is prevented from doing so by the adhesive bond. This puts a great deal of stress on the sponge and can reduce the effective playing lifetime of the sponge and top sheet. Also, with time the adhesive bond becomes stronger. In some instances the sheet can be very difficult to remove. When removing a highly bonded sheet, it is best to slowly pull the sheet off the blade. For blades which have not been sealed or which have a rough face, the sheet should be pulled up in the direction of the grain so as not to pull out wood fibers. Do not try to rip the sheet off. This will prematurely age the stop sheet of the rubber.

H. Using a Racket Press

Table tennis racket presses are very useful for regluing for a number of reasons, including: (1) presses aid in the successful bonding of heavily curled or domed sheets by holding the sheet with even pressure on all points of the racket face; (2) presses extend the speed glue effect; and (3) presses help provide consistent regluing performance. When using a racket press cover sheets should always be placed over the rubber to protect its surface. Also, never overtighten the press; light, even, constant pressure is all that is needed for most situations.

I. Removing Glue Build Up

After a number of regluings, the glue buildup may inhibit the speed glue effect. Also, glue build-up can be so great as to affect the weight balance of the racket. Glue buildup of up to six grams or more per sheet is not uncommon. If glue build-up is adversely affecting performance, the sheet can be discarded or an attempt can be made to remove the glue. Removing the glue is a very messy and time-consuming process and requires the use of powerful solvents. However, the solvent systems of the present invention solve this problem.

J. Using Speed Glue Solvent Systems

The speed glue solvent systems can be used once the sponge has been "primed" with three or four coats of adhesive system. To reglue using the solvent systems, follow approximately the same approach as discussed above except replace the adhesive systems with the solvent systems. The present speed glue solvent systems have several advantages compared to normal speed glue, including: (1) dramatically reducing the glue build-up on the sheet and greatly extending the life of the rubber sheet; (2) providing higher performance than can be achieved by increasing the solvent amounts above what is practical with normal speed glues; (3) the present solvent systems are more economical in terms of the amount needed to achieve a particular level of performance; and (4) sheets reglued with the present solvent systems can be used almost immediately.

Because the solvent systems have lower viscosities than the adhesive systems, a different approach is needed when applying the solvent systems to the "primed" sponge. Currently, the best results appear to occur by brushing onto the sponge enough fluid to completely cover a circle of about four to about five inches (100 to 125 mm) in diameter. Light brush strokes can be used to distribute the fluid evenly over the entire surface.

The first application should be allowed to dry before applying another layer of the solvent systems. This may take anywhere from two to ten minutes, depending on temperature and humidity conditions and the amount of fluid applied. If desired, apply the fluid several times, allowing the sheet to become dry between applications. Note that for each subsequent application a much smaller amount of the solvent systems will be adequate. Make sure that every area of the sponge is "wetted," and be especially careful with the edges of the sheet. A dry spot on the edge will not stick and the sheet may curl up from this point.

Several small applications of the solvent systems work better than one big application, as the first few applications open up the pores of the sponge for the later applications. The amount of fluid needed can be judged by the resultant dome increase from each application of the solvent systems. For the brave of heart go for the extreme dome by using repeated applications of solvent. But always allow each layer of the solvent systems to dry before proceeding to the next or the result may be a soggy, uneven solids layer that does not perform well.

An interesting effect is seen if one first dopes the sponge with pure D-limonene. After the sponge swells to the maximum (this takes approximately 20 to 30 minutes), a 50/50 cyclohexane/ethyl acetate mixture is then applied. Higher performance and longevity are seen when this approach is used than if one uses the three solvent blend by itself. However, the commercial viability of such a system is somewhat doubtful, as such an elaborate process is practical for only highly competitive or world class players who need every performance advantage possible.

VIII. Examples

The following examples are provided solely to illustrate certain particular features of the present invention. These examples should not be construed to limit the present invention to the particular features described.

Example 1

This example describes the formulation of a currently preferred solvent system. The materials listed in Table 6 below were combined with continuous mixing. The amounts of the components are provided as parts by weight.

TABLE 6

| Component | Weight Percent |
|---|---|
| 1. Cyclohexane | 48 |
| 2. Ethyl Acetate | 20 |
| 3. D-limonene | 7 |
| 4. Dipropylene glycol dimethyl ether | 5 |
| 5. 2,2,4-trimethylpentane | 20 |
| 6. Total | 100 |

Example 2

This example describes the formulation of a working embodiment of a solvent system. The materials listed in Table 7 below were combined with continuous mixing. The amounts of the components are provided as parts by weight.

TABLE 7

| Component | Weight Percent |
|---|---|
| 1. Cyclohexane | 63 |
| 2. Ethyl Acetate | 27 |
| 3. D-limonene | 5 |
| 4. Dipropylene glycol dimethyl ether | 5 |
| 5. Total | 100 |

Example 3

This example describes the formulation of a working embodiment of a solvent system. The materials listed in Table 8 below were combined with continuous mixing. The amounts of the components are provided as parts by weight.

TABLE 8

| Component | Weight Percent |
|---|---|
| 1. Cyclohexane | 24 |
| 2. Ethyl Acetate | 10 |
| 3. D-limonene | 3.5 |
| 4. Dipropylene glycol dimethyl ether | 2.5 |
| 5. 2,2,4-trimethylpentane | 10 |
| 6. Heptane | 50 |
| 5. Total | 100 |

Example 4

This example describes the formulation of a working embodiment of an adhesive system using the currently preferred solvent system. The adhesive system comprised about 95 parts of the solvent system and about 5 parts of a solids adhesive mixture. See, Tables 9 and 10, below. The amounts of the components are provided as parts by weight.

TABLE 9

| Solvent System | |
|---|---|
| Component | Weight Percent |
| 1. Cyclohexane | 48 parts |
| 2. Ethyl Acetate | 20 parts |
| 3. D-limonene | 7 parts |
| 4. Dipropylene glycol dimethyl ether | 5 parts |
| 5. 2,2,4-trimethylpentane | 20 parts |
| 6. Total | 100 parts |

TABLE 10

| Solids | |
|---|---|
| Component | Weight Percent |
| 1. Goodyear NATSYN 2200 (cis 1,4 polyisoprene | 74 parts |
| 2. Goodyear WINGTACK 95 | 25 parts |
| 3. Goodyear WINGSTAY L-HLS antioxidant | 1 part |
| 4. Total | 100 parts |

A room temperature cross linking agent/accelerator such as Akrochem ZDBCX (0.5 to 1 part) can be added to the solids mixture to increase the crosslink density of the synthetic polyisoprene. Unused sulfur and zinc oxide is pulled from the table tennis sponge to make the sulfur crosslinks.

Also, up to 20 parts polybutadiene can be added to the solids mixture to increase the resilience of the rubber solids. However, the resin used in the solids mixture must be changed to one which is compatible with polyisoprene and polybutadiene, such as Goodyear Wingtack 86.

Also, a peptizer might be needed with a multi-rubber polymer system to improve homogeneity of mix if large quantities of solids need to be milled.

The degree of tack of the adhesive systems is directly related to the amount of resin and polyisoprene employed in the formulation. The amount of solids in the formula can be adjusted to modify the viscosity of the adhesive systems and its resultant tack. An adhesive system with from about 3% to about 5% solids being suitable to achieve an optimum viscosity and tack for a table tennis speed glue. Higher solids, up to about 7%, could be envisioned to achieve other performance characteristics. However, at this solids level, the tack may be too high for easy removal of the rubber from the blade.

Example 5

This example describes the formulation of a working embodiment of an adhesive system using the currently preferred solvent system. The adhesive system comprised about 95 parts of a solvent system and about 5 parts of a solids mixture. See, Tables 11 and 12, below. The amounts of the components are provided as parts by weight.

TABLE 11

| Solvent System | |
|---|---|
| Component | Weight Percent |
| 1. Cyclohexane | 48 parts |
| 2. Ethyl Acetate | 20 parts |
| 3. D-limonene | 7 parts |
| 4. Dipropylene glycol dimethyl ether | 5 parts |
| 5. 2,2,4-trimethylpentane | 20 parts |
| 6. Total | 100 parts |

TABLE 12

| Solids | |
|---|---|
| Component | Weight Percent |
| 1. Goodyear NATSYN 2200 (cis 1,4 polyisoprene) | 74 parts |
| 2. Hercules PENALIN H | 25 parts |
| 3. Goodyear WINGSTAY L-HLS antioxidant | 1 part |
| 4. Total | 100 parts |

Example 6

This example describes the formulation of a working embodiment of an adhesive system using the currently preferred solvent system. The adhesive system comprised about 96 parts of a solvent system and about 4 parts of a solids mixture as listed in Tables 13 and 14, below. The amounts of the components are provided as parts by weight.

TABLE 13

| Solvent System | |
|---|---|
| Component | Amount |
| 1. Cyclohexane | 63 parts |
| 2. Ethyl Acetate | 27 parts |
| 3. D-limonene | 5 parts |
| 4. Dipropylene glycol dimethyl ether | 5 parts |
| 5. Total | 100 parts |

TABLE 14

| Solids | |
|---|---|
| Component | Weight Percent |
| 1. RT Vanderbilt Neoprene AD | 91 |
| 2. Magnesium oxide | 3.5 |
| 3. Akrochem Transparent Zinc Oxide | 4.5 |
| 4. RT Vanderbilt AGERITE SUPERLITE (antioxidant) | 1 |
| 5. Total | 100 |

VII. Performance Characteristics of Solvent and Adhesive Systems

Three primary approaches were employed to determine the performance characteristics of the present speed glues: evaluations carried out by experienced table tennis players (subjective); evaluations carried out by the inventors (subjective); and standard tests (objective).

A. Outside Evaluators

A number of experienced table tennis players were used to evaluate the performance of the present speed glues. A number of the players used in the trials were listed in the top 100 players in the world, while the remainder varied in skill level from intermediate to advanced tournament level. In addition, a number of international level coaches were utilized with strong backgrounds in the technical aspects of table tennis equipment. Key evaluators included:

1. Qiao Yunping (China)—Women's Silver Medalist (Doubles) at the 1996 Olympics & 1995 World Championships.

2. James Butler (U.S.A.)—2 time U.S. Champion—approximate 1997 World Ranking=#80.

3. Sean O'Neill (U.S.A.)—5 time U.S. Champion, 1990 North American Champion, and 2 time Olympian.

4. Christian Lillieroos—elite Swedish training Coach, U.S. & Mexican National Team Coach.

The evaluators were asked to compare the speed glue sent to them to the best prohibited speed glues, the currently allowed speed glues of which they were familiar, and previous versions of glues sent to them by the inventors for testing. The evaluators were asked to evaluate the present speed glues with respect to the following parameters: (1) ability of the glues to increase shot speed; (2) ability of the glues to increase shot spin; (3) the balance between speed/spin components; (4) ability of the glues to improve shot control; (5) longevity of the speed glue effect; (6) the stability of the glue effect over the length of time that the glue effect is present; (7) the effect of the glue on the time the ball stays on the racket for typical shots; (8) the softness/hardness of the glue interface; (9) the "noise" made by speed glued rackets; and (10) how easy/difficult was the glue to use.

Some of the evaluations were carried out using blind tests to reduce the inaccuracies created when the evaluators knew which glue they were using. Excellent correlation was found between the data provided by members of the evaluation team, as long as one took into account the differences in equipment preferences/requirements and style of play of the evaluators. For example, those players who required/preferred a "stiff-feeling" speed glue had a bias towards this type of glue versus a "soft feeling" glue.

B. Subjective Evaluations Carried Out by the Inventors

As both inventors are tournament table tennis players, a considerable emphasis was given to internal testing of candidate adhesive systems and solvent systems by using them in controlled practice sessions. A full range of table tennis strokes was carried out by both inventors using candidate speed glued table tennis rubbers on a "standard" speed glued racket. Both players independently arrived at an evaluation of the candidate glues based on the performance parameters given above. Joint discussions were made to determine if the trends observed were likely based on style differences of the inventors. The "practice" sessions typically lasted from 4 to 5 hours. Long-term studies over a period of days also were carried out.

A number of techniques were developed to determine some of the parameters on a more objective basis. For example, a crude method was developed to gauge the amount of spin on the ball by allowing it to strike a cardboard barrier without any interference from the receiving player. The receiving player walked over to the barrier to visually observe the spin on the ball.

C. Physical Tests

A number of simple physical tests were established to aid in the evaluation process. The two most commonly used tests employed in the evaluation process can be summarized as follows:

1. Bounce Test. The bounce test consisted of vertically bouncing the ball on the racket with the racket face horizontal to the floor. The individual performing the test slowly increases the impact force from a "light tap" on the ball to a "heavy" tap, at which point the ball will typically strike the ceiling of the room. It was found that the height and "feel" of the bounce could be reliably used to predict the speed, spin and control components of a candidate speed glue.

2. Spin Test. The spin test consisted of throwing a ball vertically up in the air approximately 2 feet and allowing the ball to land on the face of a moving racket. At the point of contact the observer would accelerate the racket face using a standard "serve" technique in a direction approximately parallel to the floor. The observer would catch the spinning ball with the free hand and observe the amount of spin on the ball and note the "feel" of the ball as it strikes the rubber.

IX. Performance Trends Related to Variations in Solids/Solvent Formulation

Based on the information gathered according to the previous section, trends were established which allowed the development of a comprehensive model for designing speed glues to achieve a set of performance goals based on the 10 parameters given above. Some of the most important of these trends can be summarized as provided below.

A. Effect on Performance by Varying Polymer/Polymer Blend Used in an Solid

A considerable change in performance can be achieved by varying the type and blend proportion of solids used in an adhesive formulation. Especially important are the physical properties of a polymer/polymer blend with regard to its modulus, Mooney viscosity and resilience values. For example, natural rubber comes in a variety of grades such as SMRL, RSS-1 & DPNR, each grade having its own unique set of values of modulus, Mooney viscosity and resilience. It was discovered that the Mooney viscosity had a major effect on the "softness" or "hardness" of a blend; the higher the Mooney value, the "harder" the feel of the glue solid interface. The modulus of a blend has a major effect on the spin component (higher values of modulus typically increase the spin), while the resilience has a major effect on the speed component (higher values of resilience typically increase the speed). However, unlike the Mooney viscosity which showed a clear trend, the effect on performance of the modulus and resilience are more tightly interwoven. For example, if the resilience of a blend becomes too high, this will reduce the overall energy stored in the glue/sponge system, thereby reducing both the spin and speed performance of the speed glue.

The following Table 15 illustrates some of the properties of a few of the most suitable polymers that can be employed in speed glue formulations.

TABLE 15

| Polymer | Mooney Viscosity | Modulus | Resilience |
|---|---|---|---|
| Polyisoprene | medium | medium | very high |
| SMRL | high | high | high |
| RSS #1 | very high | high | high |
| Polybutadiene | low | medium | very high |

B. Interaction of Polymer/Polymer Blends with Solvent Systems on Performance In addition, performance prediction is further complicated by the effect the solvent system has on the properties of a candidate solid. For example, it is possible to choose a solvent with high speed and low spin properties and combine such a solvent with a low speed and high spin solids interface to arrive at a suitable adhesive system.

C. Effect of the Ratio of Polymer to Resin/s on Performance

Sensitivity studies were carried out in which a family of adhesive systems were tested which consisted of a solvent blend with the solid portion of the adhesive system held to a constant while varying the polymer to resin ratio of the solid. The speed-spin balance could be readily adjusted by this ratio. To reduce the speed while increasing the spin of the adhesive system, the resin in the solid should be increased, thereby reducing the polymer/resin ratio. Using NATSYN 2200 (Polyisoprene) and Goodyear WINGTACK 95 Resin, highspin formulations were achieved when this ratio was 3 to 1. An optimum ratio for a high speed formulation was found be about 6 to 1. When the polymer-to-resin ratio was reduced below about 3 to 1, the adhesive system was deemed too tacky. At ratios somewhat above a 6 to 1 ratio, the rubber sheet will not stick to the racket properly.

The present invention has been described with reference to certain preferred embodiments. It will be apparent to those of ordinary skill in the art that the invention can be varied from that described with reference to preferred embodiments and still be within the scope of the following claims.

We claim:

1. A method for speed gluing a table tennis racket, comprising:

forming a solvent system comprising a cycloalkane having from about 3 to about 10 carbon atoms, an ester having from about 2 to about 10 carbon atoms, and a terpene having a molecular weight of from about 110 to about 160;

applying the solvent system to a table tennis rubber, a table tennis blade, or both, wherein the rubber and/or the tennis blade provides sufficient adhesive to adhere the rubber to the blade; and attaching the rubber to the blade, thereby forming a speed glued table tennis racket.

2. A speed-glued table tennis racket, comprising:

a table tennis blade; and a table tennis rubber adhered to the blade by an adhesive system that comprises, prior to application to the blade, rubber or both, (1) a solvent system comprising from about 10 to about 60 percent of a cycloalkane having from about 5 to about 10 carbon atoms, from about 5 to about 40 percent of an ester having from about 3 to about 10 carbon atoms, and from about 2 to about 20 percent of a terpene having a molecular weight of from about 110 to about 160, and (2) from about 2 to about 10 weight percent solids suitable for speed gluing table tennis rubbers to table tennis blades.

* * * * *